(12) United States Patent
Park et al.

(10) Patent No.: US 9,742,510 B2
(45) Date of Patent: Aug. 22, 2017

(54) PACKET DETECTION METHOD BASED ON NOISE POWER ESTIMATION USING ORTHOGONAL SEQUENCE, TRANSMITTER, AND RECEIVER

(71) Applicant: SAMSUNG ELECTRONICS CO., LTD., Suwon-si (KR)

(72) Inventors: Chang Soon Park, Chungju-si (KR); Joonseong Kang, Suwon-si (KR); Young Jun Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 7 days.

(21) Appl. No.: 14/877,455

(22) Filed: Oct. 7, 2015

(65) Prior Publication Data

US 2016/0173212 A1 Jun. 16, 2016

(30) Foreign Application Priority Data

Dec. 12, 2014 (KR) .................. 10-2014-0179056

(51) Int. Cl.
*H04B 17/345* (2015.01)
*H04J 13/00* (2011.01)
*H04L 27/26* (2006.01)

(52) U.S. Cl.
CPC .......... *H04B 17/345* (2015.01); *H04J 13/004* (2013.01); *H04L 27/2675* (2013.01)

(58) Field of Classification Search
CPC ... H04B 17/345; H04L 27/2675; H04J 13/004

USPC ......................................... 375/227, 224, 296
See application file for complete search history.

(56) References Cited

U.S. PATENT DOCUMENTS

| | | | | |
|---|---|---|---|---|
| 5,297,161 A * | 3/1994 | Ling | ...................... | H04B 1/707 375/130 |
| 6,178,197 B1 * | 1/2001 | Froelich | ................. | H04B 1/707 375/150 |
| 7,269,187 B2 * | 9/2007 | Kidambi | ............. | H04L 27/2675 370/208 |
| 8,270,528 B2 * | 9/2012 | Zeng | ...................... | H04L 7/042 375/135 |
| 9,008,195 B2 * | 4/2015 | Lan | ........................ | H04L 27/261 375/143 |
| 2004/0032825 A1 * | 2/2004 | Halford | ............... | H04L 27/0008 370/208 |
| 2004/0136439 A1 * | 7/2004 | Dewberry | ............ | H04B 1/7075 375/130 |

(Continued)

FOREIGN PATENT DOCUMENTS

| | | | |
|---|---|---|---|
| JP | 2010-074564 A | 4/2010 | |
| JP | 2010-268375 A | 11/2010 | |

(Continued)

*Primary Examiner* — Helene Tayong
(74) *Attorney, Agent, or Firm* — NSIP Law

(57) ABSTRACT

A packet detection method of a receiver estimates noise power based on received samples and an orthogonal sequence that is orthogonal to a preamble sequence of a transmitter. The method verifies whether a packet is present in a radio channel based on the noise power. Also provided is a transmitter that selects a preamble sequence, modulates a transmission packet, and transmits the modulated transmission packet for reception by such a receiver.

15 Claims, 12 Drawing Sheets

(56) References Cited

U.S. PATENT DOCUMENTS

| | | | |
|---|---|---|---|
| 2005/0152480 A1* | 7/2005 | Chang | H04B 1/1027 375/343 |
| 2007/0153761 A1* | 7/2007 | Fechtel | H04B 1/709 370/350 |
| 2008/0101520 A1 | 5/2008 | Huang et al. | |
| 2009/0304128 A1 | 12/2009 | Izumi et al. | |
| 2011/0069707 A1* | 3/2011 | Roh | H04L 27/2071 370/392 |
| 2011/0103523 A1 | 5/2011 | Wallace et al. | |
| 2012/0128109 A1 | 5/2012 | Wallace et al. | |
| 2013/0114645 A1* | 5/2013 | Huang | H04B 1/7083 375/147 |
| 2013/0177088 A1* | 7/2013 | Lan | H04L 27/261 375/259 |
| 2014/0036829 A1 | 2/2014 | Lee et al. | |
| 2014/0119477 A1* | 5/2014 | Hong | H04L 27/06 375/340 |
| 2014/0378054 A1* | 12/2014 | Wang | H04B 7/26 455/41.2 |

FOREIGN PATENT DOCUMENTS

| | | |
|---|---|---|
| KR | 10-0789921 B1 | 12/2007 |
| KR | 10-0881997 B1 | 2/2009 |
| KR | 10-0897527 B1 | 5/2009 |
| KR | 10-2011-0046333 A | 5/2011 |
| KR | 10-2011-0071755 A | 6/2011 |
| KR | 10-2014-0036477 A | 3/2014 |

* cited by examiner

100

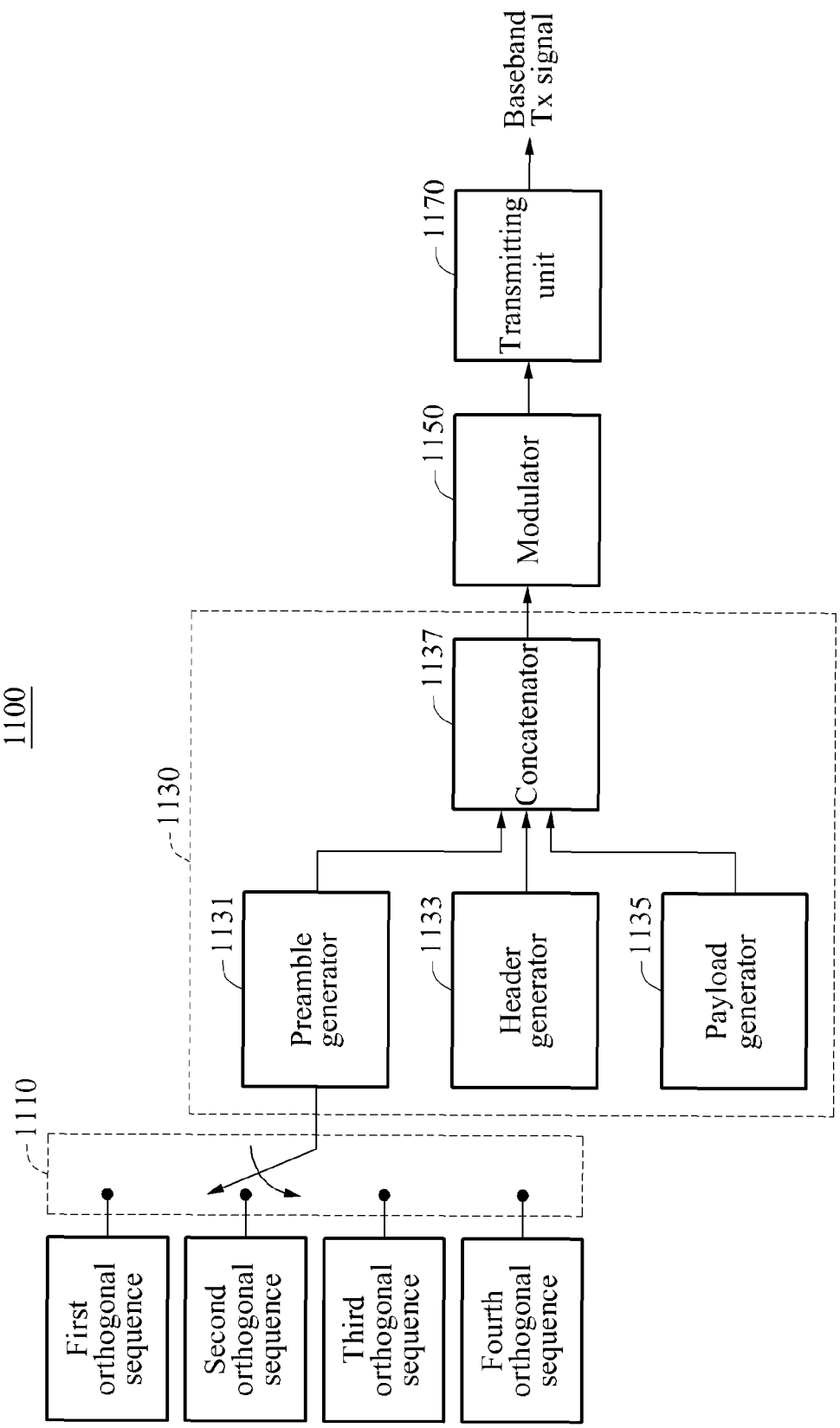

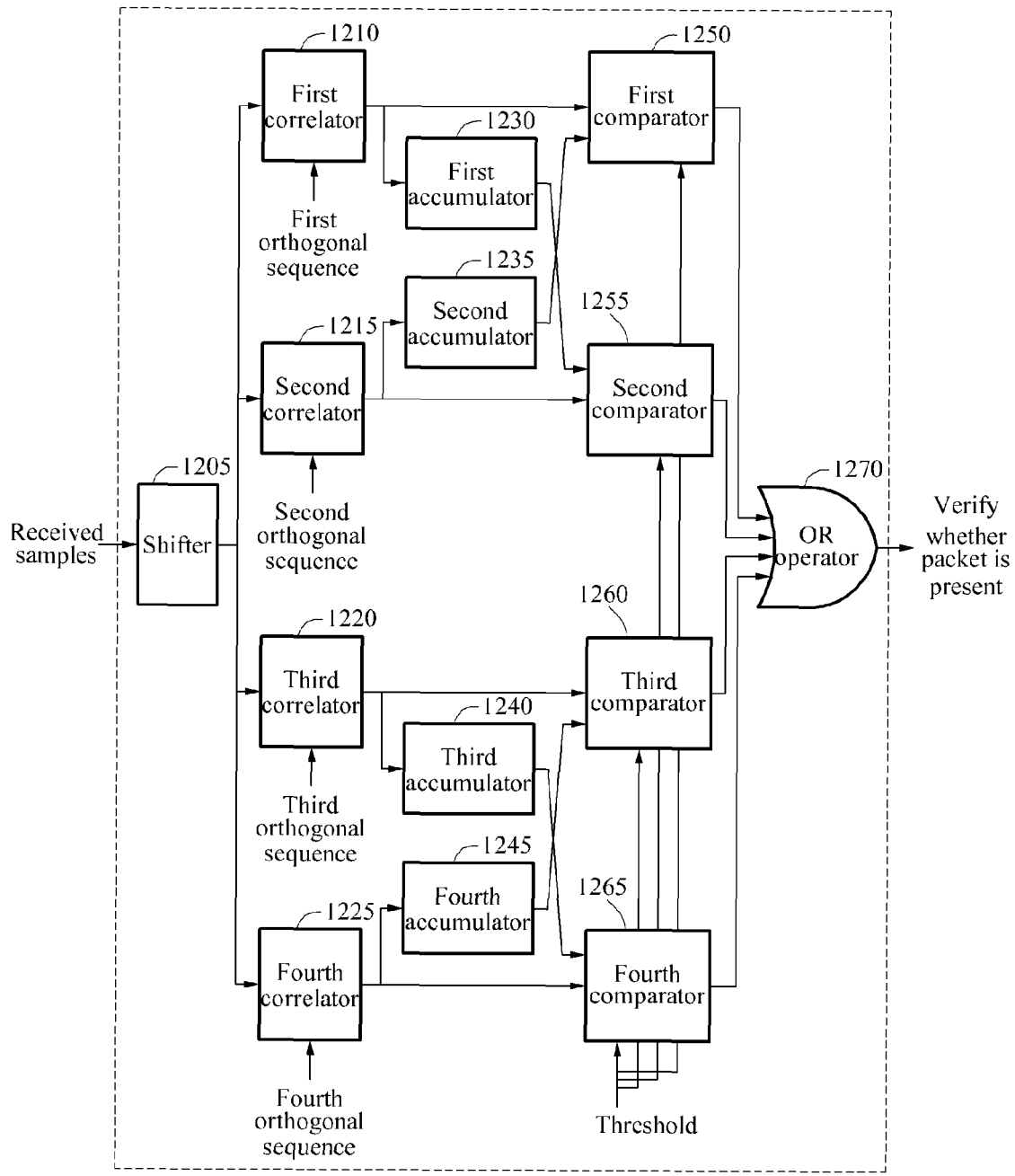

PACKET DETECTION METHOD BASED ON NOISE POWER ESTIMATION USING ORTHOGONAL SEQUENCE, TRANSMITTER, AND RECEIVER

CROSS-REFERENCE TO RELATED APPLICATION(S)

This application claims the benefit under 35 USC 119(a) of Korean Patent Application No. 10-2014-0179056 filed on Dec. 12, 2014, in the Korean Intellectual Property Office, the entire disclosure of which is incorporated herein by reference for all purposes.

BACKGROUND

1. Field

The following description relates to a packet detection method based on noise power estimation using an orthogonal sequence, a transmitter, and a receiver.

2. Description of Related Art

A digital radio communication system may transmit and receive data in packet units. When a transmitter transmits packets wirelessly, a receiver may first determine whether a packet other than noise is present in a current radio channel. When such a packet is determined to be present, the receiver may perform signal processing for time synchronization of the packet, and detect data of a header and a payload in the packet.

To verify whether a packet is present in the radio channel, the receiver may use an intensity value or a power of a noise signal calculated in a period in which only noise is present before a packet arrives at the radio channel. In this example, a timing mismatching between a period in which noise and a packet are present and each signal processing may impede noise power estimation and may also impede accurate verification regarding whether a packet is present in a current radio channel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a packet detection method of a receiver includes estimating noise power based on received samples and an orthogonal sequence that is orthogonal to a preamble sequence of a transmitter, and verifying whether a packet is present in a radio channel based on the noise power.

A correlation value between the orthogonal sequence and the preamble sequence may correspond to 0, irrespective of a phase difference between the preamble sequence and the orthogonal sequence.

The estimating may include estimating a signal intensity of a packet based on the received samples and the preamble sequence.

The verifying may include verifying whether a packet is present in the radio channel based on the signal intensity of the packet and the noise power.

The estimating of the signal intensity of the packet may include estimating the signal intensity of the packet based on first correlation values between the received samples and the preamble sequence.

The estimating of the noise power may include estimating the noise power based on second correlation values between the received samples and the orthogonal sequence.

The method may further include calculating a result of accumulating the estimated noise power and a predetermined scaling factor, wherein the verifying includes comparing a result of the calculating to the signal intensity of the packet, and verifying whether a packet is present based on a result of the comparing.

The verifying may include verifying that a packet is present in response to the signal intensity of the packet being greater than the result of the calculating.

The verifying may include increasing a time index and updating a correlation window period in which a correlation value is sampled in response to the signal intensity of the packet being less than or equal to the result of the calculating.

In another general aspect, a non-transitory computer-readable storage medium includes a program comprising instructions to cause a computer to perform the above method.

In another general aspect, a receiver includes a first correlator configured to correlate received samples with a preamble sequence of a transmitter to estimate a signal intensity of a packet, a second correlator configured to correlate the received samples with an orthogonal sequence that is orthogonal to the preamble sequence to estimate noise power, and a comparator configured to compare a resulting value of the first correlator to a resulting value of the second correlator to verify whether a packet is present in a radio channel.

The receiver may further include an accumulator configured to accumulate resulting values of the second correlator, wherein the comparator is configured to compare the resulting value of the first correlator to a cumulative value obtained by accumulating the resulting values of the second correlator.

The receiver may further include a multiplier configured to multiply the cumulative value by a predetermined scaling factor, wherein the comparator is configured to compare a result of the multiplying to the signal intensity of the packet.

The receiver may further include a shifter configured to shift the received samples.

In another general aspect, a transmitter includes a packet generator configured to select one of a plurality of preamble sequences, and configure a transmission packet based on the selected preamble sequence, a modulator configured to modulate the transmission packet, and a transmitting unit configured to transmit the modulated transmission packet.

A correlation value between the preamble sequences may correspond to 0.

In another general aspect, a receiver includes a first correlator configured to correlate samples received from a transmitter with a first orthogonal sequence, a second correlator configured to correlate the received samples with a second orthogonal sequence that is orthogonal to the first orthogonal sequence, a first comparator configured to compare a resulting value of the first correlator to a second cumulative value obtained by accumulating resulting values of the second correlator, a second comparator configured to compare a resulting value of the second correlator to a first cumulative value obtained by accumulating resulting values of the first correlator, and an OR operator configured to perform a logical OR operation with respect to a result of the comparing by the first comparator and a result of the comparing by the second comparator.

The receiver may further include a first accumulator configured to accumulate the resulting values of the first correlator, and a second accumulator configured to accumulate the resulting values of the second correlator.

The receiver may further include a shifter configured to shift the received samples.

A correlation value between the first orthogonal sequence and the second orthogonal sequence may correspond to 0.

In another general aspect, a packet detection method of a receiver includes performing a first correlation of received samples with a preamble sequence of a transmitter to estimate a signal intensity of a packet, performing a second correlation of the received samples with an orthogonal sequence that is orthogonal to the preamble sequence to estimate noise power, and comparing a resulting value of the first correlation to a resulting value of the second correlation to verify whether a packet is present in a radio channel.

Other features and aspects will be apparent from the following detailed description, the drawings, and the claims.

BRIEF DESCRIPTION OF THE DRAWINGS

FIG. 11 is a block diagram illustrating an example of a transmitter.

FIG. 12 is a block diagram illustrating an example of a receiver.

Figure 1:
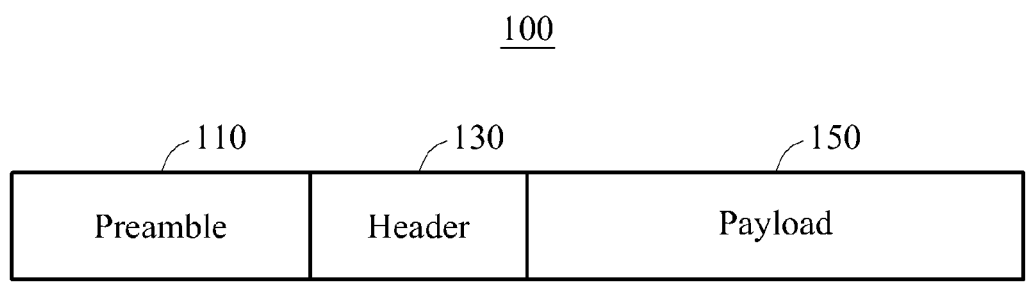
FIG. 1 is a diagram illustrating an example of a structure of a packet to be used herein.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

Various alterations and modifications are optionally made to the examples. Here, the examples are not construed as limited to the disclosure and are intended to be understood to include all changes, equivalents, and replacements within the scope of the disclosure.

The terminology used herein is for the purpose of describing particular examples only and is not to limit of the examples. As used herein, the singular forms "a", "an", and "the" are intended to include the plural forms as well, unless the context clearly indicates otherwise. It is intended to be further understood that the terms "include/comprise" and/or "have", when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It is intended to be further understood that terms, such as those defined in commonly-used dictionaries, are intended to be interpreted as having a meaning that is consistent with their meaning in the context of the relevant art and are not intended to be interpreted in an idealized or overly formal sense unless expressly so defined herein.

When describing the examples with reference to the accompanying drawings, like reference numerals refer to like constituent elements and a repeated description related thereto is omitted for brevity. When it is determined detailed description related to a related known function or configuration makes the purpose of the examples unnecessarily ambiguous in describing the examples, the detailed description is omitted here for clarity.

FIG. 1 is a diagram illustrating an example of a structure of a packet to be used herein.

Referring to FIG. 1, a structure of a packet 100 configured to include, in order, a preamble 110, a header 130, and a payload 150 is illustrated.

In the example of FIG. 1, the preamble 110 is a portion configured to perform synchronization or correct a non-ideal or otherwise defective offset, and is disposed at the front of the packet 100. In the example of FIG. 1, the header 130 is a portion of the packet 100 configured to provide transmission and reception format information of the packet 100, and is disposed in the middle of the packet 100. In the example of FIG. 1, the payload 150 is a portion of the packet 100 including meaningful data, and is disposed at the very end of the packet 100. Thus, the preamble 110 helps coordinate receipt of the packet 100, the header 130 helps interpret the structure of the packet 100, and the payload 150 contains the information carried by the packet 100.

In an example, noise power is estimated using an orthogonal sequence that is orthogonal to a sequence included in a predetermined period of the preamble 110, for example, a preamble sequence. In such an example, whether the packet 100 is present in a radio channel is verified based on the estimated noise power. Using orthogonality between the preamble sequence and the orthogonal sequence, whether a packet is present is verified robustly, irrespective of whether only noise is present or a desired packet is present in a current reception period in the radio channel.

In general, when estimating a signal intensity of noise in a period in which a desired packet is present, the signal intensity of the noise similar to a signal intensity of the desired packet is obtained due to considering a timing mismatch between a signal processing time with respect to a packet and an actual period in which the packet is present.

When a signal intensity of a packet is similar to a signal intensity of noise, signal processing regarding whether a packet is present in a current channel is potentially not performed accurately. Such a situation, in which a signal intensity of a packet is similar to a signal intensity of noise, occurs in various cases as follows.

First, when a receiver enters a reception mode later than a transmission point in time in a situation in which an accurate transmission point in time of a transmitter is unknown, a signal intensity of a packet is similar to a signal intensity of noise.

Second, when a receiver fails in subsequent synchronization signal processing despite successful packet detection, it is sometimes required that signal processing for packet detection is re-performed. In this example, in a case in which signal processing for estimating noise power in a signal period in which a packet is already present is performed inaccurately, a signal intensity of a packet is similar to a signal intensity of noise.

Third, a period in which only noise is present is potentially not secured appropriately due to an amount of time to be used by a transceiver to switch between a transmission mode and a reception mode. More specifically, in a time division duplex (TDD) based communication system, transmission and reception are performed during different time periods. When a relatively long time is taken until reception is re-initiated after transmission is completed in such a system, noise power is estimated after a packet already arrives. Thus, accurate signal processing for packet detection is difficult.

In this example, the time used until reception is re-initiated after transmission is completed is referred to as a transmission-to-reception (Tx-to-Rx) turnaround time. In communication standards, a Tx-to-Rx turnaround time is suggested as a value to be satisfied in general during the communication process. In particular, in a case of a low-power, low-complexity transceiver, in an example, such a chip has a low operation clock rate, and a settling time corresponding to a time used until a radio frequency (RF) and an analog block enter a stable state increases. Thus, an amount of time used to switch between transmission and reception increases, which leads to a decrease in packet detection performance.

Aside from the foregoing issues, when a relatively long time is used until reception is re-initiated after transmission is completed, time-delayed received samples are used to estimate a signal intensity of a packet and noise power. Thus, a complexity and a power consumption of a transceiver increase.

In an example, by estimating a signal intensity of a packet and noise power based on samples received in an identical time period in a structure of a low-power, low-complexity transceiver, as discussed above, a packet is detected accurately despite an increase in an amount of time used to switch between a transmission mode and a reception mode.

Figure 2:
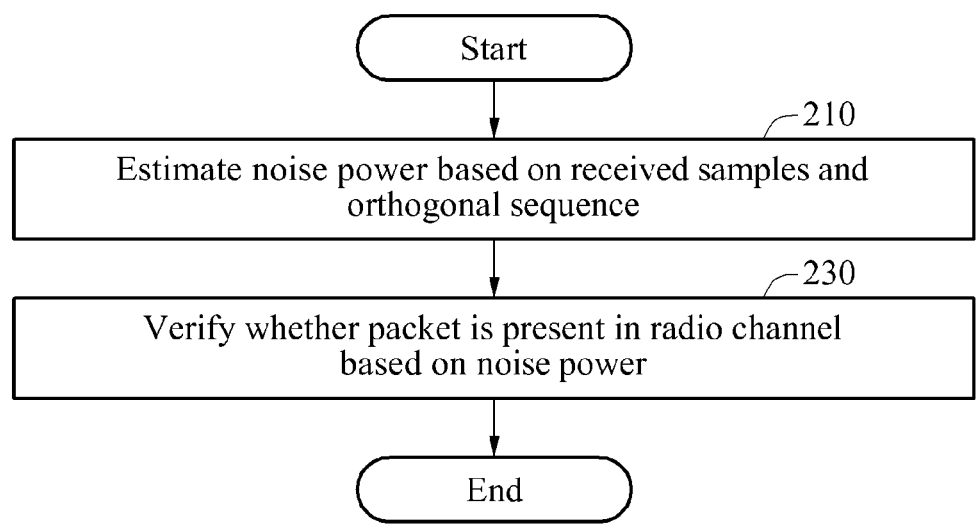
FIG. 2 is a flowchart illustrating an example of a packet detection method of a receiver.

FIG. 2 is a flowchart illustrating an example of a packet detection method of a receiver.

Referring to FIG. 2, in operation 210, the method estimates noise power based on received samples and an orthogonal sequence. For example, a receiver estimates noise power based on received samples and an orthogonal sequence that is orthogonal to a preamble sequence transmitted by a transmitter.

The preamble sequence refers to a sequence in a preamble period prearranged between the transmitter and the receiver. In the sense of an actual signal transmitted by the transmitter, the preamble sequence is also referred to as the "original sequence" or the "original preamble sequence".

A correlation value between the orthogonal sequence and the preamble sequence corresponds to 0, based on their orthogonal relationship, because orthogonality implies that two sequences are not correlated. Orthogonality between the orthogonal sequence and the preamble sequence is maintained, irrespective of whether the preamble sequence and the orthogonal sequence are in phase. In this example, a single orthogonal sequence or n orthogonal sequences are potentially used. n is a multiple of 2, for example, 2, 4, or 8. When the number of orthogonal sequences corresponds to a multiple of 2, orthogonality between preamble sequences transmittable by the transmitter is satisfied.

In an example, the received samples are analog-to-digital converter (ADC) samples received by the receiver from the transmitter in an identical time period, for example, a time period of one to three seconds. The meaning and use of the term "identical time period" is described further later.

In operation 230, the method verifies whether a packet is present in a radio channel based on the estimated noise power. For example, the receiver verifies whether a packet is present in a radio channel based on the estimated noise power.

Figure 3:
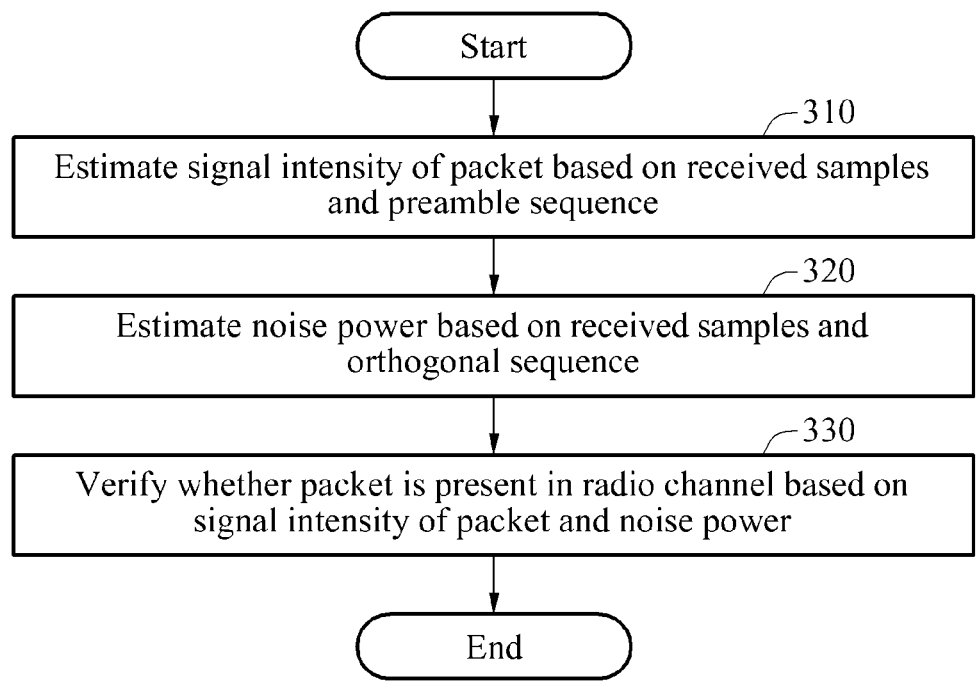
FIG. 3 is a flowchart illustrating an example of a packet detection method of a receiver.

FIG. 3 is a flowchart illustrating an example of a packet detection method of a receiver.

Referring to FIG. 3, in operation 310, the method estimates a signal intensity of a packet based on received samples and a preamble sequence. For example, a receiver estimates a signal intensity of a packet based on received samples and a preamble sequence. In such an example, the receiver estimates the signal intensity of the packet by using a first correlation value calculated based on a preamble sequence used for actual transmission.

In operation 320, the method estimates noise power based on the received samples and an orthogonal sequence that is orthogonal to the preamble sequence. For example, the receiver estimates noise power based on the received samples and an orthogonal sequence that is orthogonal to the preamble sequence.

The received samples used in operations 310 and 320 may be ADC samples received in an identical time period. The statement "received in an identical time period" used here is intended to indicate that the received samples used to estimate the signal intensity of the packet and the noise power are received in an identical time period with no time difference between the start time and the end time of the period under consideration.

In operation 330, the method verifies whether a packet is present in a radio channel based on the signal intensity of the packet and the noise power. For example, the receiver verifies whether a packet is present in a radio channel based on the signal intensity of the packet and the noise power.

In an example, the receiver verifies whether a packet is present based on the signal intensity of the packet estimated through the first correlation value calculated based on the preamble sequence and the noise power estimated through a second correlation value calculated based on the orthogonal sequence.

Figure 4:
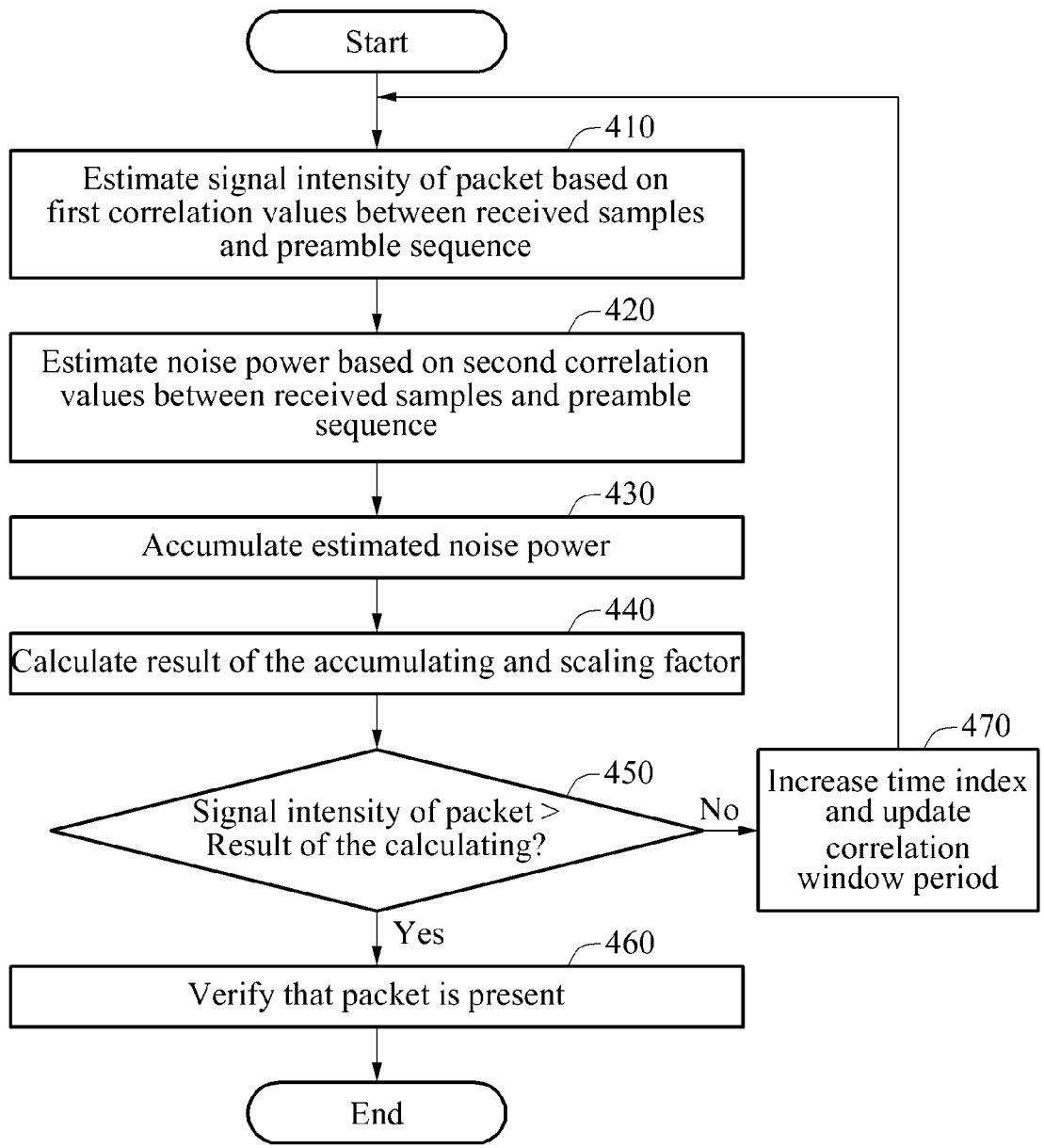
FIG. 4 is a flowchart illustrating an example of a packet detection method of a receiver.

FIG. 4 is a flowchart illustrating an example of a packet detection method of a receiver.

Referring to FIG. 4, in operation 410, the method estimates a signal intensity of a packet based on first correlation values between received samples and a preamble sequence. For example, a receiver estimates a signal intensity of a packet based on first correlation values between received samples and a preamble sequence.

In operation 420, the method estimates noise power based on second correlations value between the received samples and an orthogonal sequence. For example, the receiver estimates noise power based on second correlations value between the received samples and an orthogonal sequence. In such an example, a correlation value between the orthogonal sequence and the preamble sequence corresponds to 0, irrespective of a phase difference between the preamble sequence and the orthogonal sequence. Further, the correlation value between the orthogonal sequence and the preamble sequence corresponds to 0, irrespective of whether the preamble sequence and the orthogonal sequence are in phase with one another.

In such an example, the receiver obtains two correlation values, a first correlation value R1 calculated based on a preamble sequence used for actual transmission and a second correlation value R2 calculated based on an orthogonal sequence that is orthogonal to the preamble sequence, based on commonly received samples, for example ADC samples received in an identical time period, as discussed above.

For example, first correlation values R1 are obtained by correlations between a preamble sequence c1(n) corresponding to an original sequence transmitted from a transmitter through a preamble period and received ADC samples x(n). In such an example, the first correlation values R1 are obtained through using Equation 1.

$$R1 = \sum_{n=0}^{N-1} c1(n) \cdot x(n) \qquad \text{Equation 1}$$

In Equation 1, n denotes a sampling time index of a received sample, and N denotes a correlation window size provided in a communication system.

The preamble sequence c1(n) is a sequence of a preamble period predetermined and arranged between the transmitter and the receiver. Thus, the receiver also uses the same preamble sequence.

Second correlation values R2 are obtained by correlations between an orthogonal sequence c2(n) and the received ADC samples x(n). In such an example, the orthogonal sequence c2(n) is orthogonal to the preamble sequence c1(n), and a correlation value between the orthogonal sequence c2(n) and the preamble sequence c1(n) corresponds to 0.

For example, the second correlation values R2 are obtained through using Equation 2.

$$R2 = \sum_{n=0}^{N-1} c2(n) \cdot x(n) \qquad \text{Equation 2}$$

In Equation 2, c2(n) denotes an orthogonal sequence that is orthogonal to the sequence c1(n).

Here, orthogonality is defined as a correlation value between a preamble sequence and an orthogonal sequence that is maintained as 0, irrespective of a shift with respect to a time index. Here, orthogonality between sequences is expressed by using Equation 3.

$$\sum_{n=0}^{N-1} c1(\text{mod}(n+i, N)) \cdot c2(n) = 0, \qquad \text{Equation 3}$$

for all $i$, i.e., $i = 0, 1, 2, \ldots, N-1$

In Equation 3, the function mod(y, N) denotes a modulo operation. More specifically, a modulo operation produces a remainder indivisible by an integer when dividing an integer y by an integer N.

Equation 3 indicates that a correlation value between sequences is maintained as 0 when two sequences are exactly in phase, for example, in a case of i=0 in Equation 3, but also when the sequences are out of phase and cyclically-shifted, for example, in a case of i=1, 2, ..., N-1 in Equation 3.

In a case in which an orthogonal sequence that satisfies all of the preceding orthogonal conditions with the preamble sequence used by the transmitter is difficult to find, the receiver uses, in such a case, a near-orthogonal sequence that has a correlation value near zero. Because such a near-orthogonal sequence has a correlation value that is very small, the near-orthogonal has properties that are similar to those of a sequence that is actually orthogonal.

In operation 430, the method accumulates the estimated noise power. For example, the receiver accumulates the estimated noise power.

In an example, when all of the first correlation values between the received samples and the preamble sequence and the second correlation values between the received samples and the orthogonal sequence are obtained, the receiver obtains a cumulative value R3 by continuously accumulating and adding up the second correlation values obtained to date. Thus, the cumulative value R3 is obtained through using Equation 4.

$$R3 = \sum_{k=1}^{m} R2(k) \qquad \text{Equation 4}$$

In Equation 4, k denotes an index value. More specifically, the index value is used as a correlation index that increases by 1 every time the two correlation values R1 and R2 are obtained. R2(k) denotes a second correlation value obtained in the index k, and m denotes a calculation count of the second correlation value.

In operation 440, the method calculates a result of the accumulating and a predetermined scaling factor. For example, the receiver calculates a result of the accumulating and a predetermined scaling factor. In an example, the receiver multiplies the cumulative value R3 by the predetermined scaling factor. In an example, the scaling factor is a value advantageous to an increase in a probability of successful packet detection, and is thus adjusted appropriately in the communication system. For example, the scaling factor is obtained by multiplying a threshold parameter value adjustable in the communication system by a predetermined constant.

In operation 450, the method compares a result of the calculating to the signal intensity of the packet. For example, the receiver compares a result of the calculating to the signal intensity of the packet. In an example, the receiver compares a value obtained by multiplying the cumulative value R3 by the predetermined scaling factor to the first correlation values R1.

The receiver verifies whether a packet is present based on a result of the comparing. For example, as a result of the comparing, when the signal intensity of the packet is greater than the result of the calculating, in operation 460, the method verifies that packet detection succeeds, by establishing that a packet is present. For example, the receiver verifies that packet detection succeeds, by establishing that a packet is present. Once the packet detection has been established as successful, the receiver terminates signal processing for packet detection.

As a result of the comparing at operation 450, when the signal intensity of the packet is less than or equal to the result of the calculating, in operation 470 the method increases a time index and updates a correlation window period in which a correlation value is sampled. For example, the receiver increases a time index and updates a correlation window period in which a correlation value is sampled.

For example, the receiver configures a new correlation window period by shifting time indices of the received ADC samples to a subsequent time period. The receiver iteratively performs operation 410 and the subsequent operations until packet detection is determined to succeed with respect to the updated correlation window period, such as for example, the new correlation window period. The foregoing signal processing process is illustrated in a block diagram as shown in FIG. 5.

Figure 5:
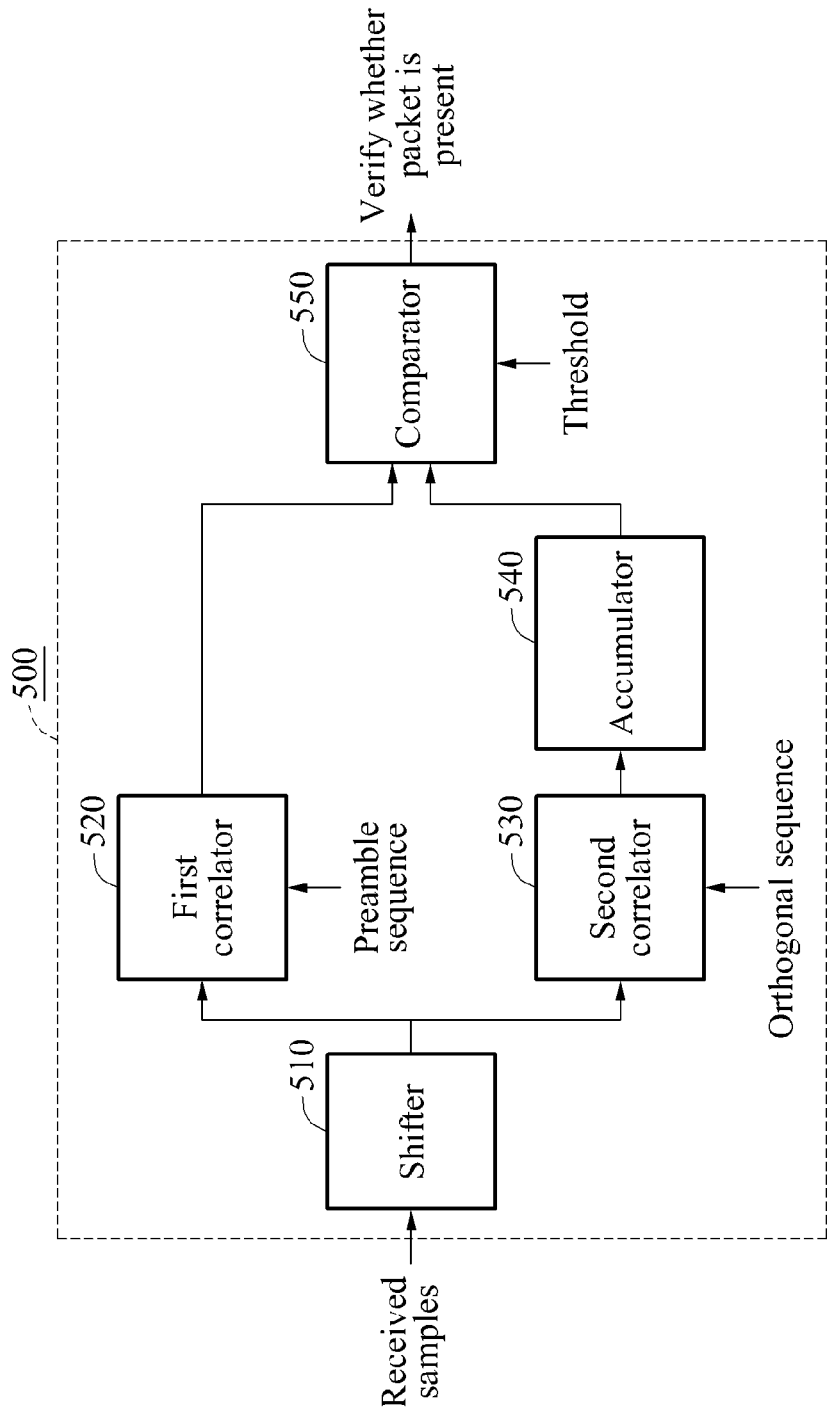
FIG. 5 is a block diagram illustrating an example of a receiver.

FIG. 5 is a block diagram illustrating an example of a receiver using a single orthogonal sequence.

Referring to FIG. 5, a receiver 500 includes a shifter 510, a first correlator 520, a second correlator 530, an accumulator 540, and a comparator 550.

In the example of FIG. 5, the shifter 510 shifts received samples based on a correlation index value, for example, by one bit to the right.

The first correlator 520 correlates the received samples with a preamble sequence of a transmitter to estimate a signal intensity of a packet.

The second correlator 530 correlates the received samples with an orthogonal sequence that is orthogonal to the preamble sequence to estimate noise power.

The comparator 550 compares a resulting value of the first correlator 520 to a resulting value of the second correlator 530 to verify whether a packet is present in a radio channel. In such a comparison, the comparator 550 compares the resulting value of the first correlator 520 to the resulting value of the second correlator 530 and outputs 0 or 1.

The accumulator 540 accumulates resulting values, for example, derived correlation values, of the second correlator 530. In this example, the comparator 550 compares the resulting value of the first correlator 520 to a cumulative value obtained by accumulating the resulting values of the second correlator 530.

A reason for accumulating the resulting values of the second correlator 530 using the accumulator 540 is as follows.

By contrast to signal power, noise power is able to change at random. Thus, by continuously performing accumulation before a correlation with an orthogonal sequence is finally utilized as noise power, such a random characteristic of noise power irregularly changing is reduced.

In an example, the random characteristic of noise power is reduced through a digital low-pass filter using sample values obtained for a predetermined period as an input, rather than accumulating correlation values.

In an example, the receiver 500 further includes a multiplier, not shown, that is configured to multiply the cumulative value by a predetermined scaling factor. In this example, the comparator 550 compares a result of the multiplying to the signal intensity of the packet.

Figure 6:
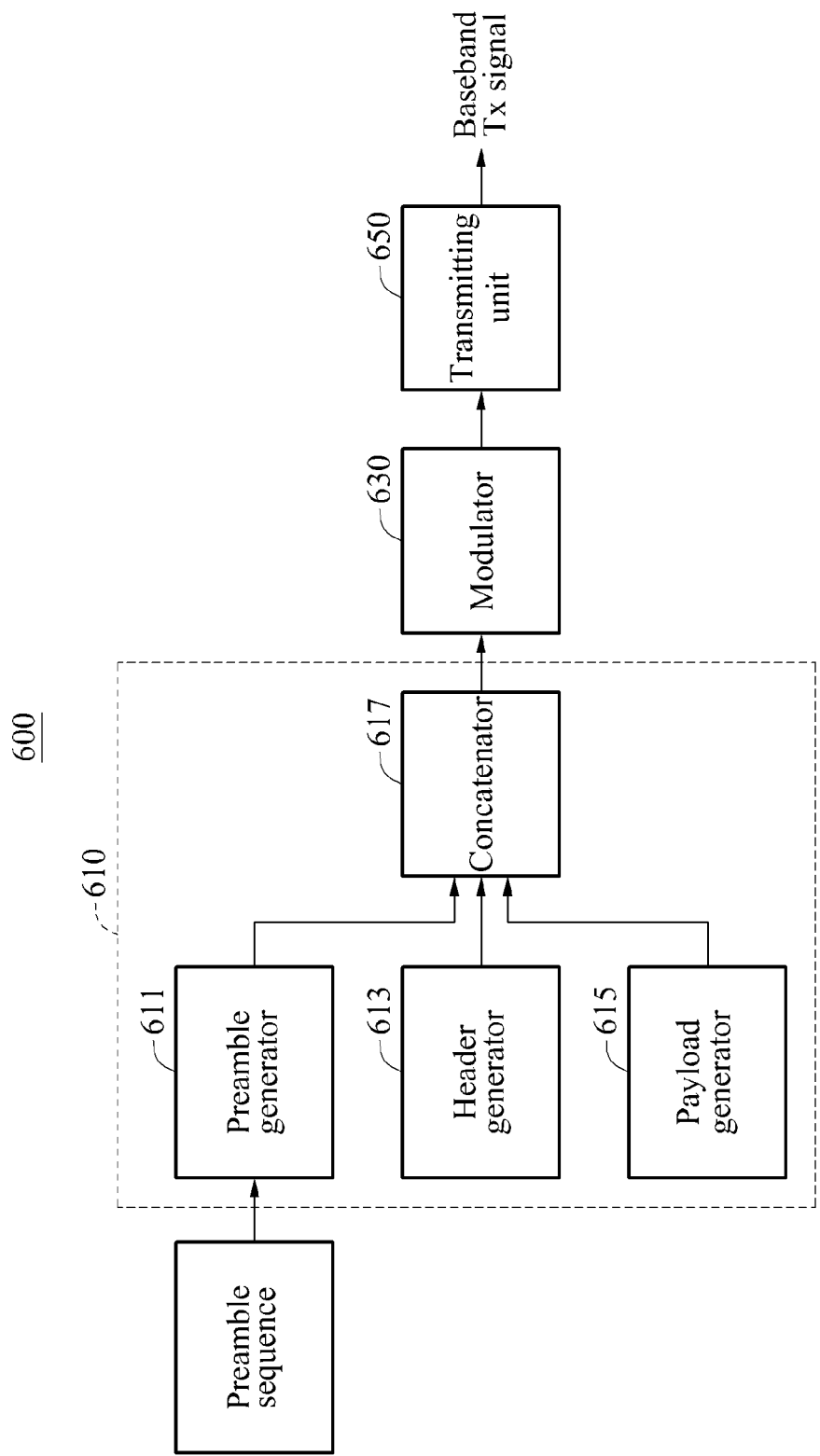
FIG. 6 is a block diagram illustrating an example of a transmitter to transmit a transmission packet.

FIG. 6 is a block diagram illustrating an example of a transmitter to transmit a transmission packet.

Referring to FIG. 6, a configuration of a transmitter 600 to configure a transmission packet in a case in which a single preamble sequence is provided is illustrated.

In the example of FIG. 6, the transmitter 600 includes a packet generator 610, a modulator 630, and a transmitting unit 650.

For example, the packet generator 610 generates a transmission packet. In this example, the packet generator 610 includes a preamble generator 611, a header generator 613, a payload generator 615, and a concatenator 617.

In the example of FIG. 6, the preamble generator 611 configures a preamble of the transmission packet using a preamble sequence. In this example, a single preamble sequence is used.

For example, the header generator 613 generates a header of the transmission packet.

The payload generator 615 configures a payload including data or information to be transmitted through the transmission packet.

The concatenator 617 concatenates the preamble, the header, and the payload into a single transmission packet.

The modulator 630 modulates the transmission packet.

The transmitting unit 650 transmits the modulated transmission packet through a baseband.

Figure 7:
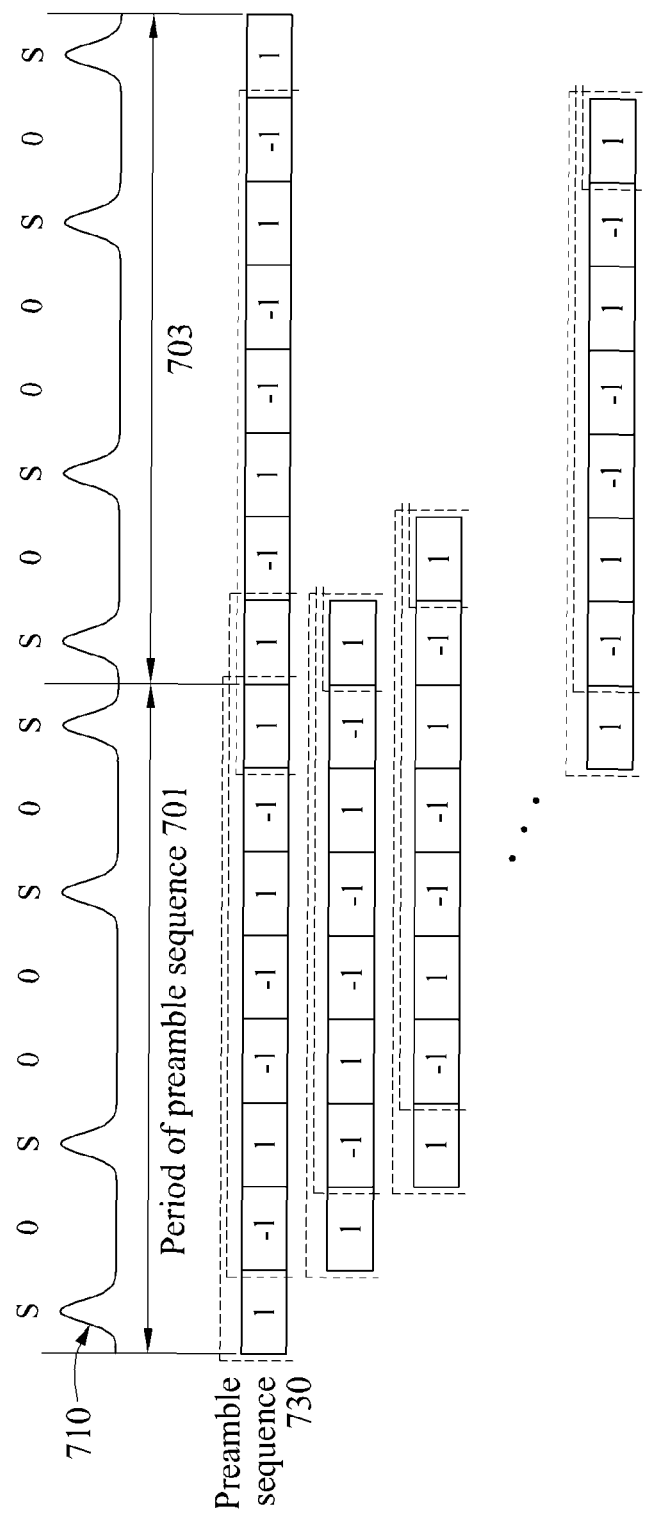
FIG. 7 illustrates an example of a preamble sequence used in a packet detection method.

FIG. 7 illustrates an example of a preamble sequence used in a packet detection method.

Referring to FIG. 7, a preamble sequence 730 prearranged between a transmitter and a receiver and an actual transmission waveform 710 are illustrated.

In the example of FIG. 7, it is assumed that the transmitter generates and transmits a Gaussian waveform when an element to be transmitted is 1, and does not generate a signal when the element to be transmitted is −1. Here, a Gaussian waveform is a "bell curve" and the occurrence of such a peak indicates the presence of a 1.

In the example of FIG. 7, when the transmitter generates a transmission signal by repeating the preamble sequence 730 in a first period 701 and a second period 703, the transmission waveform 710 of a baseband is generated. In this example, values indicated above the transmission waveform 710 denote magnitudes corresponding to central portions in the transmission waveform of each period.

For example, the receiver shifts the preamble sequence 730 by one bit and correlates the shifted preamble sequence with received sample values. In an example, the preamble sequence 730 is shifted by one bit to the right based on a correlation index. For example, such shifting is performing by the shifter 510 of FIG. 5.

Figure 8:
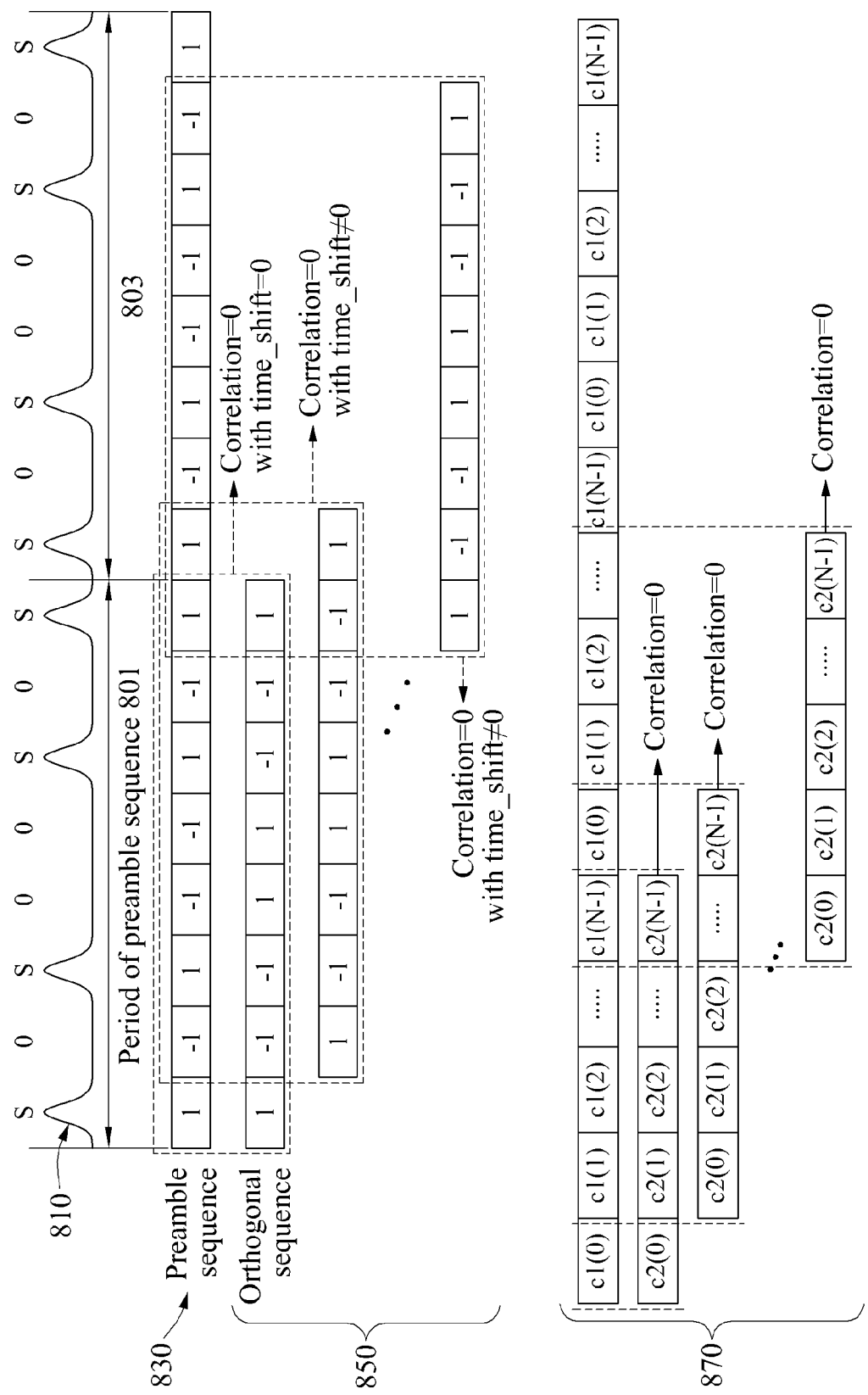
FIG. 8 illustrates an example of a process of processing a correlation signal between a preamble sequence and an orthogonal sequence.

FIG. 8 illustrates an example of an orthogonality condition being satisfied between a preamble sequence and an orthogonal sequence.

Referring to the example of FIG. 8, a transmission waveform 810 of a baseband, a preamble sequence 830, and an orthogonal sequence 850 that is orthogonal to the preamble sequence 830 are illustrated. For example, the preamble sequence 830 is repeated in a first period 801 and a second period 803.

In an example, it is assumed that a preamble sequence c1 and an orthogonal sequence c2 are as follows.

$c1=[c1(0), c1(1), c1(2), c1(3), c1(4), c1(5), c1(6), c1(7)]=[1, -1, 1, -1, -1, 1, -1, 1]$ $c2=[c2(0), c2(1), c2(2), c2(3), c2(4), c2(5), c2(6), c2(7)]=[1, -1, -1, 1, 1, -1, -1, 1]$

For example, when the transmission waveform 810 is received, a receiver obtains correlation values between received ADC sample values and a preamble sequence. In this example, when the ADC sample values are in perfect time synchronization with the preamble sequence, the receiver obtains relatively large correlation values. However, when the ADC sample values are not in perfect time synchronization with the preamble sequence, the receiver obtains relatively small correlation values. Thus, the correlation values act as a metric of how good the time synchronization is between the ADC sample values and the preamble sequence.

By maintaining orthogonality between the preamble sequence and the orthogonal sequence, the receiver is able to obtain uniform correlation values between the ADC sample values received from the transmitter and the orthogonal sequence in a case of perfect time synchronization and even in a case of imperfect time synchronization. Such a capability is achieved because a signal component is removed and only a noise component remains due to the orthogonality between the preamble sequence and the orthogonal sequence.

As shown in a portion 870, when a correlation value between the preamble sequence c1 and the orthogonal sequence c2 is maintained as 0 at all times, the correlation values between the ADC samples and the orthogonal sequence are values including only noise components. Here, the noise components are the values from which signal components are removed, irrespective of whether times are synchronized in a preamble period in which times are yet to be synchronized. On the foregoing basis, a packet is detected by estimating noise power, irrespective of whether a packet is present or noise is present in a current reception period.

In an example, further, a reception period of ADC samples to be used to estimate noise power and a reception period of ADC samples to be used to estimate a signal intensity of a packet or packet power are set to be identical on a time axis.

In this example, it is to be noted that a preamble sequence actually received by the receiver and an orthogonal sequence are possibly out of phase or are inadvertently in phase on a time axis in a situation in which packet detection is performed in a preamble period with imperfect synchronization.

Thus, in some examples, an orthogonal sequence in which an orthogonality of correlation is maintained irrespectively in a case of being out of phase with a preamble sequence and a case of being in phase with a preamble sequence is used, and a resulting correlation value is estimated as noise power, based on the orthogonality. In this example, the case of being out of phase is a case in which the preamble sequence is cyclically-shifted.

Figure 9:
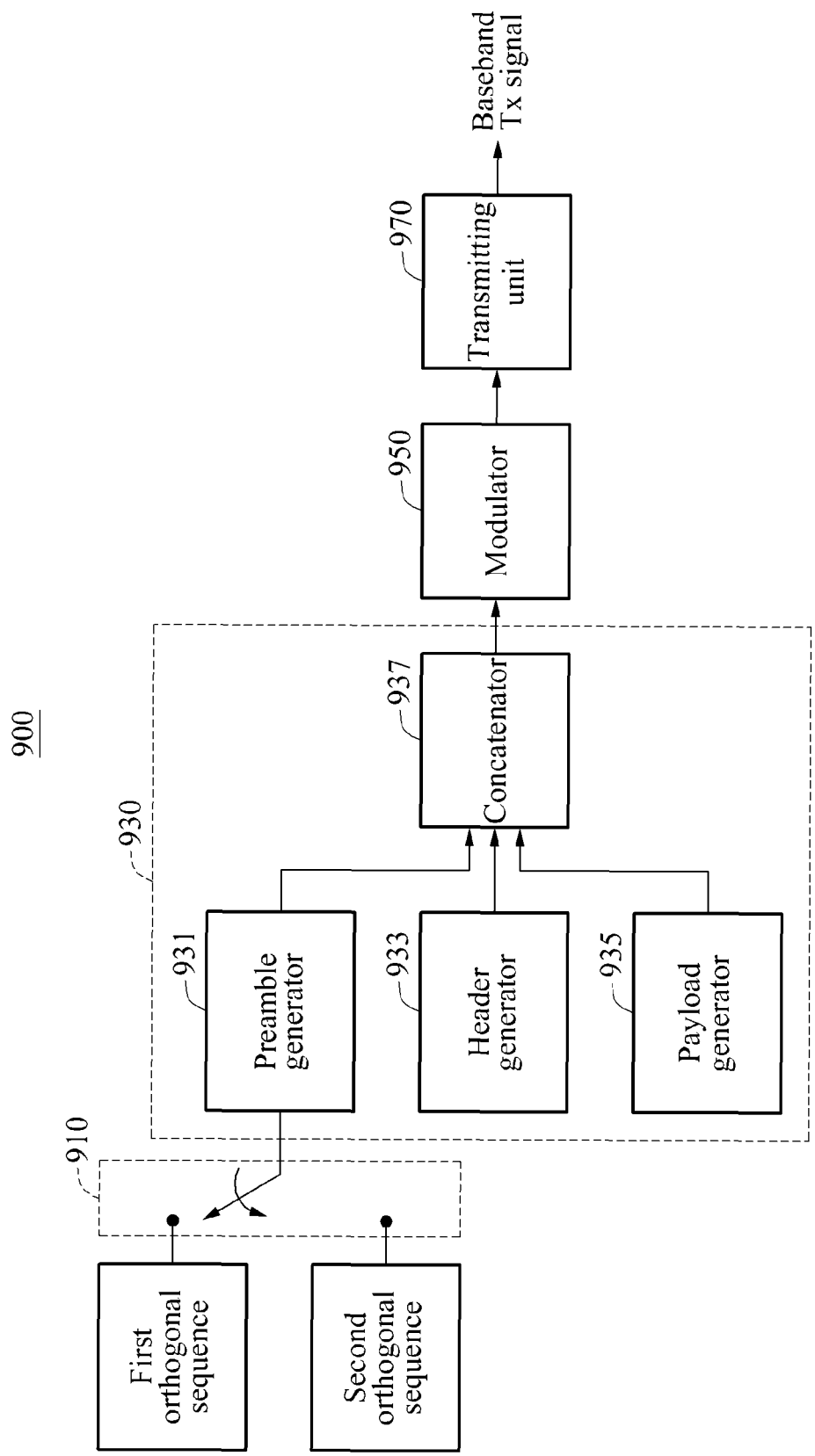
FIG. 9 is a block diagram illustrating an example of a transmitter.

FIG. 9 is a block diagram illustrating an example of a transmitter.

Referring to the example of FIG. 9, a configuration of a transmitter 900 to configure a transmission packet by selecting one of two preamble sequences that are orthogonal to each other is illustrated. For example, the preamble sequences correspond to orthogonal sequences, and a correlation value between the sequences corresponds to 0. Thus, the preamble sequences are referred to as a "first orthogonal sequence" and a "second orthogonal sequence".

In the example of FIG. 9, the transmitter 900 includes a selector 910, a packet generator 930, a modulator 950, and a transmitting unit 970.

For example, the selector 910 selects one of a plurality of preamble sequences, in this example, orthogonal sequences. In an example, the plurality of preamble sequences are the "first orthogonal sequence" and the "second orthogonal sequence", as discussed.

Thus, the selector 910 selects one of the preamble sequences using a predetermined method depending on a channel state or a format of a payload to be transmitted.

For example, when a period of each preamble sequence is defined as a cardinal number in a minimum period to be repeated, the selector 910 employs a method of selecting a preamble sequence having a shorter period when transmitting a format of a payload that corresponds to a higher data transmission rate.

The packet generator 930 configures a transmission packet using the selected preamble sequence. In an example, the transmitter 900 enables the packet generator 930 to directly select one of the plurality of preamble sequences using the same method, rather than through the selector 910. In such an example, the selector 910 is omitted.

More specifically, the packet generator 930 includes a preamble generator 931, a header generator 933, a payload generator 935, and a concatenator 937. The descriptions of the elements preamble generator 611, the header generator 613, the payload generator 615, and the concatenator 617 are applicable to the corresponding elements of preamble generator 931, the header generator 933, the payload generator 935, and the concatenator 937. Thus, duplicated descriptions are omitted for brevity.

For example, the modulator 950 modulates the transmission packet.

Likewise, the transmitting unit 970 transmits the modulated transmission packet.

Figure 10:
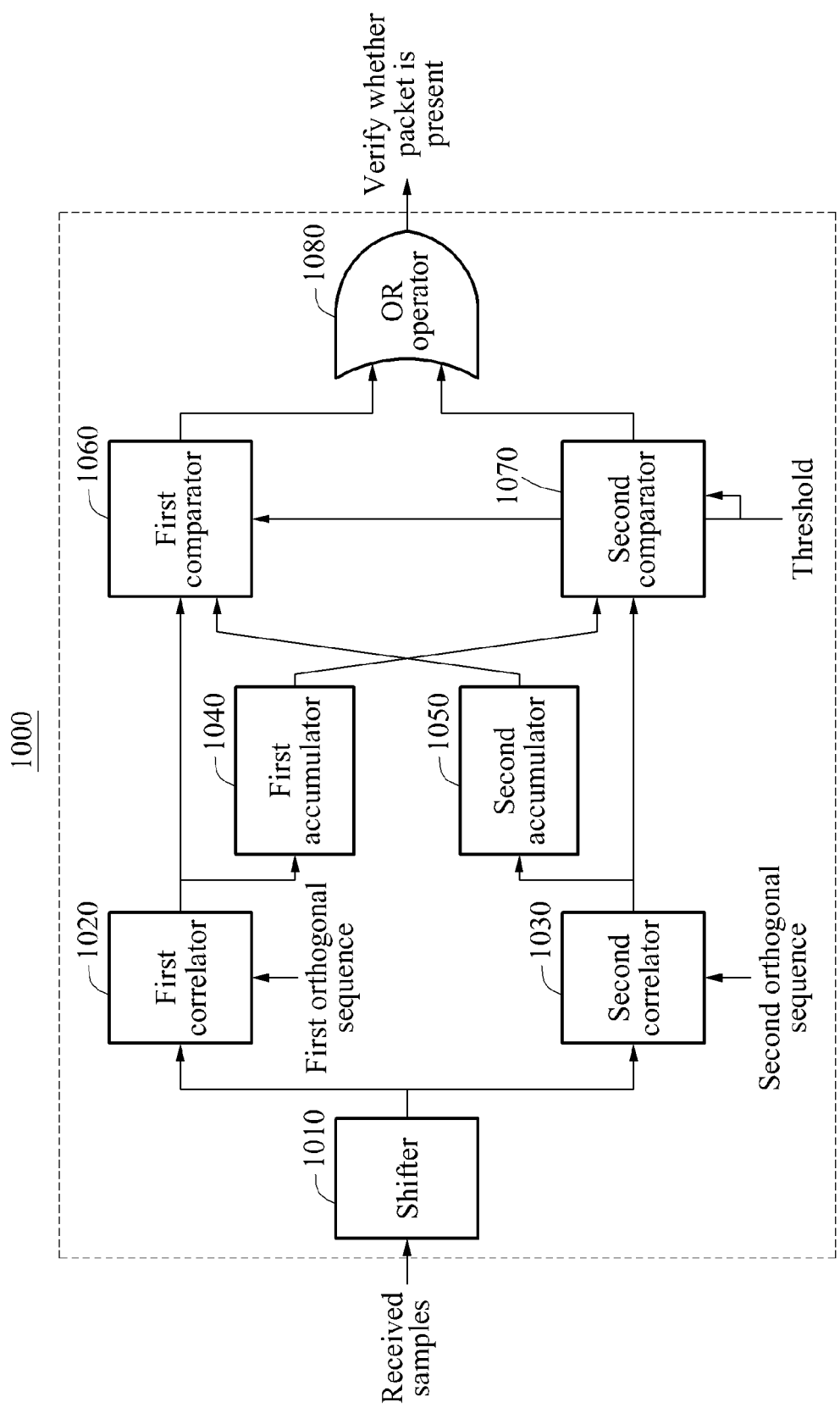
FIG. 10 is a block diagram illustrating an example of a receiver.

FIG. 10 is a block diagram illustrating an example of a receiver.

Referring to FIG. 10, a configuration of a receiver 1000 to detect a packet in a case in which two orthogonal sequences are available in a preamble period is illustrated. Here, preamble sequences that are available to a transmitter and orthogonal to each other are referred to as a first orthogonal sequence and a second orthogonal sequence. In an example, the first orthogonal sequence and the second orthogonal sequence are sequences prearranged between the transmitter and the receiver 1000.

In the example of FIG. 10, the receiver 1000 includes a shifter 1010, a first correlator 1020, a second correlator 1030, a first accumulator 1040, a second accumulator 1050, a first comparator 1060, a second comparator 1070, and an OR operator 1080.

For example, the shifter 1010 shifts received samples based on a correlation index. In an example, the received samples are ADC samples.

For example, the first correlator 1020 correlates the received samples with the first orthogonal sequence. In this example, the first correlator 1020 obtains first correlation values by correlating the shifted received samples with the first orthogonal sequence.

The second correlator 1030 correlates the received samples with the second orthogonal sequence that is orthogonal to the first orthogonal sequence. Similar to the first correlator 1020, the second correlator 1030 obtains second correlation values by correlating the shifted received samples with the second orthogonal sequence.

In such an example, a correlation value between the first orthogonal sequence and the second orthogonal sequence corresponds to 0.

In this example, the first accumulator 1040 accumulates resulting values of the first correlator 1020.

Likewise, the second accumulator 1050 accumulates resulting values of the second correlator 1030.

For example, the first comparator 1060 compares a resulting value of the first correlator 1020 to a second cumulative value obtained by accumulating the resulting values of the second correlator 1030. Here, the first comparator 1060 compares the resulting value of the first correlator 1020 to the second cumulative value and then outputs 0 or 1 based on the result of the comparison.

Likewise, the second comparator 1070 compares a resulting value of the second correlator 1030 to a first cumulative value obtained by accumulating the resulting values of the first correlator 1020. The second comparator 1070 compares the resulting value of the second correlator 1030 to the first cumulative value and outputs 0 or 1 based on the result of the comparison.

Also, the OR operator 1080 performs a logical OR operation with respect to a result of the comparing by the first comparator 1060 and a result of the comparing by the second comparator 1070.

The receiver 1000 verifies whether a packet is present based on a result of the performing by the OR operator 1080. However, the receiver 1000 potentially does not know which one of the first correlator 1020 and the second correlator 1030 is the correlator that receives a packet. Thus, the first correlator 1020 and the second correlator 1030 perform operations simultaneously, and the OR operator 1080 performs the OR operation with respect to respective corresponding results to verify whether a packet is present.

Here, a method of detecting a packet in the receiver 1000 in a case in which the transmitter selects and transmits one of a plurality of preamble sequences used in a preamble period is described further.

In some examples, the receiver 1000 performs detection in a situation in which the receiver 1000 does not know which preamble sequence, among the plurality of preamble sequences, is transmitted by the transmitter. In this example, the receiver 1000 sets the plurality of preamble sequences that are candidate preamble sequences that are transmittable by the transmitter as orthogonal sequences that are orthogonal to each other.

For example, the receiver 1000 estimates noise power based on the plurality of orthogonal sequences, and detects a packet based on the estimated noise power.

In an example, the sequences available to the transmitter in the preamble period are a first orthogonal sequence and a second orthogonal sequence.

When the transmitter selects and transmits one of the plurality of orthogonal preambles, for example, the first orthogonal sequence and the second orthogonal sequence, the receiver 1000 potentially does not know which orthogonal sequence is the particular orthogonal sequence that is transmitted by the transmitter.

Since the receiver 1000 does not necessarily know which orthogonal sequence is selected and transmitted by the transmitter, the receiver 1000 instead verifies whether a packet is received using both the first orthogonal sequence and the second orthogonal sequence.

For example, the first correlator 1020 and the second correlator 1030 obtain first correlation values and second correlation values by correlating received samples with the first orthogonal sequence and the second orthogonal sequence, respectively, so as to estimate a signal intensity of a packet.

Further, the first accumulator 1040 and the second accumulator 1050 each obtain a first cumulative value and a second cumulative value based on the first correlation values and the second correlation values, respectively, in order to estimate a signal intensity of noise.

The first comparator 1060 compares a first correlation value to the second cumulative value and outputs 0 or 1. Likewise, the second comparator 1070 compares a second correlation value to the first cumulative value and outputs 0 or 1.

For example, a result of the comparing by the first comparator 1060 and a result of the comparing by the second comparator 1070 are transmitted to the OR operator 1080. The OR operator 1080 verifies whether a packet is present if at least one comparator result indicates a packet's presence.

When the transmitter transmits the first orthogonal sequence, the receiver 1000 regards the first correlation values between the received samples and the first orthogonal sequence as a signal intensity of a desired packet, regards the second correlation values between the received samples and the second orthogonal sequence as a signal intensity of noise, and compares the first correlation values to the second correlation values by using the first comparator 1060.

When the transmitter transmits the second orthogonal sequence, the receiver 1000 regards the second correlation values between the received samples and the second orthogonal sequence as a signal intensity of a desired packet, regards the first correlation values between the received samples and the first orthogonal sequence as a signal intensity of noise, and compares the second correlation values to the first correlation values by using the second comparator 1070.

Before the first comparator 1060 and the second comparator 1070 perform the comparisons, in an example, the receiver 1000 additionally uses the first accumulator 1040 and the second accumulator 1050, or a low-pass filter to average out a random characteristic of each value regarded as a signal intensity of noise.

When the signal intensity of the packet is determined to be greater than the signal intensity of the noise based on a result of the comparing by either of the first comparator 1060 and the second comparator 1070, the receiver 1000 determines that a packet is detected by applying the logical OR operation of the OR operator 1080.

FIG. 11 is a block diagram illustrating an example of a transmitter.

Referring to FIG. 11, a configuration of a transmitter 1100 to configure a transmission packet by selecting one of four preamble sequences that are orthogonal to each other is illustrated. In this example, the four preamble sequences available to the transmitter 1100 are orthogonal sequences, and correlation values among the sequences correspond to 0.

For example, the following four different orthogonal sequences $c1$, $c2$, $c3$, and $c4$ are available in a preamble period. The transmitter 1100 transmits a transmission packet by selecting one of the four orthogonal sequences c1, c2, c3, and c4. In this example, the four different orthogonal sequences are orthogonal to each other.

$$c1 = \begin{bmatrix} c1(0), c1(1), c1(2), c1(3), c1(4), c1(5), c1(6), c1(7), \\ c1(8), c1(9), c1(10), c1(11), c1(12), c1(13), c1(14), c1(15), \end{bmatrix}$$
$$= [1, -1, 1, -1, 1, -1, 1, -1, 1, -1, 1, -1, 1, -1, 1, -1]$$

$$c2 = \begin{bmatrix} c2(0), c2(1), c2(2), c2(3), c2(4), c2(5), c2(6), c2(7), \\ c2(8), c2(9), c2(10), c2(11), c2(12), c2(13), c2(14), c2(15), \end{bmatrix}$$
$$= [1, -1, -1, 1, 1, -1, -1, 1, 1, -1, -1, 1, 1, -1, -1, 1]$$

$$c3 = \begin{bmatrix} c3(0), c3(1), c3(2), c3(3), c3(4), c3(5), c3(6), c3(7), \\ c3(8), c3(9), c3(10), c3(11), c3(12), c3(13), c3(14), c3(15), \end{bmatrix}$$
$$= [1, -1, 1, -1, -1, 1, -1, 1, 1, -1, 1, -1, -1, 1, -1, 1]$$

$$c4 = \begin{bmatrix} c4(0), c4(1), c4(2), c4(3), c4(4), c4(5), c4(6), c4(7), \\ c4(8), c4(9), c4(10), c4(11), c4(12), c4(13), c4(14), c4(15), \end{bmatrix}$$
$$= [1, -1, 1, -1, 1, -1, 1, -1, -1, 1, -1, 1, -1, 1, -1, 1]$$

Here, the four preamble sequences that are available to the transmitter 1100 and orthogonal to each other are referred to as a first orthogonal sequence c1, a second orthogonal sequence c2, a third orthogonal sequence c3, and a fourth orthogonal sequence c4.

In the example of FIG. 11, the transmitter 1100 includes a packet generator 1130, a modulator 1150, and a transmitting unit 1170.

For example, the packet generator 1130 includes a preamble generator 1131, a header generator 1133, a payload generator 1135, and a concatenator 1137. Further, the packet generator 1130 optionally further includes a selector 1110.

In the example of FIG. 11, the selector 1110 selects one of the first orthogonal sequence c1, the second orthogonal sequence c2, the third orthogonal sequence c3, and the fourth orthogonal sequence c4. For example, the selector 1110 selects one of the preamble sequences using a predetermined method depending on a channel state or a format of a payload that is to be transmitted.

For example, when a period of each preamble sequence is defined as a cardinal number in a minimum period to be repeated, the selector 1110 employs a method of selecting a preamble sequence having a shorter period when transmitting a format of a payload that corresponds to a higher data transmission rate.

In such an example, the preamble generator 1131 generates a preamble of a transmissions packet using the orthogonal sequence selected by the selector 1110.

Also, the header generator 1133 generates a header of the transmission packet.

Further, the payload generator 1135 generates a payload including data or information to be transmitted through the transmission packet.

Subsequently, the concatenator 1137 concatenates the preamble, the header, and the payload into the transmission packet.

Also, in such an example, the modulator 1150 modulates the transmission packet.

For example, the transmitting unit 1170 transmits the modulated transmission packet through a baseband.

FIG. 12 is a block diagram illustrating an example of a receiver.

Referring to FIG. 12, a configuration of a receiver 1200 to detect a packet in a case in which a transmitter selects and transmits one of four different preamble sequences is illustrated.

In the example of FIG. 12, the four preamble sequences available to the transmitter are orthogonal sequences that are orthogonal to each other, and correlation values among the orthogonal sequences correspond to 0.

Here, the four preamble sequences that are orthogonal to each other are referred to as a first orthogonal sequence, a second orthogonal sequence, a third orthogonal sequence, and a fourth orthogonal sequence. In an example, the first orthogonal sequence, the second orthogonal sequence, the third orthogonal sequence, and the fourth orthogonal sequence are sequences prearranged between the transmitter and the receiver 1200.

In the example of FIG. 12, the receiver 1200 includes a shifter 1205, a first correlator 1210, a second correlator 1215, a third correlator 1220, a fourth correlator 1225, a first accumulator 1230, a second accumulator 1235, a third accumulator 1240, a fourth accumulator 1245, a first comparator 1250, a second comparator 1255, a third comparator 1260, a fourth comparator 1265, and an OR operator 1270.

For example, the shifter 1205 shifts received samples based on a correlation index. In an example, the received samples are ADC samples.

In the example of FIG. 12, the first correlator 1210 correlates the received samples with the first orthogonal sequence. In this example, the first correlator 1210 obtains first correlation values by correlating the shifted received samples with the first orthogonal sequence.

The second correlator 1215 correlates the received samples with the second orthogonal sequence that is orthogonal to the first orthogonal sequence. Similar to the first correlator 1210, the second correlator 1215 obtains second correlation values by correlating the shifted received samples with the second orthogonal sequence.

The third correlator 1220 correlates the received samples with the third orthogonal sequence. In this example, the third correlator 1220 obtains third correlation values by correlating the shifted received samples with the third orthogonal sequence.

The fourth correlator 1225 correlates the received samples with the fourth orthogonal sequence. In this example, the fourth correlator 1225 obtains fourth correlation values by correlating the shifted received samples with the fourth orthogonal sequence.

In this example, correlation values among the first orthogonal sequence, the second orthogonal sequence, the third orthogonal sequence, and the fourth orthogonal sequence correspond to 0.

In this example, the first accumulator 1230 accumulates resulting values of the first correlator 1210.

The second accumulator 1235 accumulates resulting values of the second correlator 1215.

The third accumulator 1240 accumulates resulting values of the third correlator 1220.

The fourth accumulator 1245 accumulates resulting values of the fourth correlator 1225.

In the example of FIG. 12, the first comparator 1250 compares a resulting value of the first correlator 1210 to a second cumulative value obtained by accumulating the resulting values of the second accumulator 1235.

Likewise, the second comparator 1255 compares a resulting value of the second correlator 1215 to a first cumulative value obtained by accumulating the resulting values of the first correlator 1210.

Also, the third comparator 1260 compares a resulting value of the third correlator 1220 to a fourth cumulative value obtained by accumulating the resulting values of the fourth correlator 1225.

Similarly, the fourth comparator 1265 compares a resulting value of the fourth correlator 1225 to a third cumulative value obtained by accumulating the resulting values of the third correlator 1220.

In the example of FIG. 12, the OR operator 1270 performs a logical OR operation with four inputs, with respect to a result of the comparing by the first comparator 1250, a result of the comparing by the second comparator 1255, a result of the comparing by the third comparator 1260, and a result of the comparing by the fourth comparator 1265. When a signal intensity of a packet is determined to be greater than a signal intensity of noise based on a result of the comparing by any comparator, that is, any one of the first comparator 1250, the second comparator 1255, the third comparator 1260, and the fourth comparator 1265, the receiver 1200 determines that a packet is detected.

For example, the sequences available to the transmitter in a preamble period are a first orthogonal sequence, a second orthogonal sequence, a third orthogonal sequence, and a fourth orthogonal sequence.

When the transmitter selects and transmits one of the plurality of orthogonal preambles, for example, the first orthogonal sequence, the second orthogonal sequence, the third orthogonal sequence, and the fourth orthogonal sequence, the receiver 1200 possibly does not know which orthogonal sequence is transmitted by the transmitter.

Since the receiver 1200 potentially does not know which orthogonal sequence is selected and transmitted by the transmitter, the receiver 1200 verifies whether a packet is received by considering all of the first orthogonal sequence, the second orthogonal sequence, the third orthogonal sequence, and the fourth orthogonal sequence.

The first correlator 1210, the second correlator 1215, the third correlator 1220, and the fourth correlator 1225 obtain first correlation values, second correlation values, third correlation values, and fourth correlation values by correlating received samples with the first orthogonal sequence, the second orthogonal sequence, the third orthogonal sequence, and the fourth orthogonal sequence, respectively. These correlation values are used to estimate a signal intensity of a packet.

Further, the first accumulator 1230, the second accumulator 1235, the third accumulator 1240, and the fourth accumulator 1245 obtain a first cumulative value, a second cumulative value, a third cumulative value, and a fourth cumulative value based on the first correlation values, the second correlation values, the third correlation values, and the fourth correlation values, respectively, to estimate a corresponding signal intensity of noise.

For example, the first comparator 1250 compares a first correlation value to the second cumulative value and outputs 0 or 1. The second comparator 1255 compares a second correlation value to the first cumulative value and outputs 0 or 1. The third comparator 1260 compares a third correlation value to the fourth cumulative value and outputs 0 or 1. The fourth comparator 1265 compares a fourth correlation value to the third cumulative value and outputs 0 or 1.

A result of the comparing by the first comparator 1250, a result of the comparing by the second comparator 1255, a result of the comparing by the third comparator 1260, and a result of the comparing by the fourth comparator 1265 are be transmitted to the OR operator 1270 for simultaneous consideration.

The operations of the transmitter and the receiver described with reference to FIGS. 2 through 12 are also applicable to a case in which the transmitter selects and transmits one of a plurality of different preamble sequences provided in a number corresponding to a multiple of 2, for example, 8 or 16, and the receiver detects a received packet.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A packet detection method of a receiver, the method comprising:
   estimating a signal intensity of a packet based on a received samples and a preamble sequence of the transmitter;
   estimating noise power based on the received samples and an orthogonal sequence that is orthogonal to a preamble sequence of a transmitter;
   calculating a result of accumulating the estimated noise power and a predetermined scaling factor; and
   verifying whether a packet is present in a radio channel based on the noise power,
   wherein the verifying comprises
   comparing the result of the calculating to the signal intensity of the packet, and
   verifying whether the packet is present based on a result of the comparing, and
   wherein the orthogonal sequence is determined such that correlation values between the preamble sequence and the orthogonal sequence are smaller than a predetermined value, the correlation values being calculated based on phase differences between the preamble sequence and the orthogonal sequence.

2. The method of claim 1, wherein the orthogonal sequence is determined based on an Equation, below, $$\sum_{n=0}^{N-1} c1(\mathrm{mod}(n+i, N)) \cdot c2(n) = 0,$$

for all $i$, i.e., $i = 0, 1, 2, \ldots, N-1$ $c1(\mathrm{mod}(n=i, N)) \cdot c2(n) = 0$, for all $i$, i.e., $i=0, 1, 2, \ldots, N-1$    Equation wherein the c1(n) is a sequence of a preamble period predetermined and arranged between the transmitter and the receiver, the c2(n) is a orthogonal sequence, the mod(y, N) denotes a modulo operation, wherein the y is a integer, N denotes a size of a correlation window and is an integer, n is a sampling time index, and i is a index that indicates a difference of phases between the preamble sequence and the orthogonal sequence.

3. The method of claim 1, wherein the verifying comprises verifying whether the packet is present in the radio channel based on the signal intensity of the packet and the noise power.

4. The method of claim 1, wherein the estimating of the signal intensity of the packet comprises estimating the signal intensity of the packet based on first correlation values between the received samples and the preamble sequence.

5. The method of claim 1, wherein the estimating of the noise power comprises estimating the noise power based on second correlation values between the received samples and the orthogonal sequence.

6. The method of claim 1, wherein the verifying comprises verifying that the packet is present in response to the signal intensity of the packet being greater than the result of the calculating.

7. A packet detection method of a receiver, the method comprising:
   estimating a signal intensity of a packet based on received samples and a preamble sequence of a transmitter;
   estimating a noise power based on correlation values between the received samples and the orthogonal sequence that is orthogonal to the preamble sequence of the transmitter;
   calculating a result of accumulating the estimated noise power and a predetermined scaling factor;
   comparing the results of the calculation to the signal intensity of the packet;
   verifying whether the packet is present in a radio channel based on the result of the comparing; and
   increasing a time index and updating a correlation window period in which the correlation value is sampled in response to the signal intensity of the packet being less than or equal to the result of the calculating.

8. A non-transitory computer-readable storage medium storing instructions that, when executed by a processor, cause the processor to perform the method of claim 1.

9. A receiver comprising:
a first correlator configured to correlate received samples with a preamble sequence of a transmitter to estimate a signal intensity of a packet;
a second correlator configured to correlate the received samples with an orthogonal sequence that is orthogonal to the preamble sequence to estimate noise power; and
a comparator configured to compare a resulting value of the first correlator to a resulting value of the second correlator to verify whether a-the packet is present in a radio channel,
wherein the orthogonal sequence is determined such that correlation values between the preamble sequence and the orthogonal sequence are smaller than a predetermined value, the correlation values being calculated based on phase differences between the preamble sequence and the orthogonal sequence; and
an accumulator configured to accumulate resulting values of the second correlator,
wherein the comparator is configured to compare the resulting value of the first correlator to a cumulative value obtained by accumulating the resulting values of the second correlator.

10. The receiver of claim 9, further comprising:
a multiplier configured to multiply the cumulative value by a predetermined scaling factor, wherein the comparator is configured to compare the result of the multiplying to the signal intensity of the packet.

11. The receiver of claim 9, further comprising:
a shifter configured to shift the received samples.

12. A receiver comprising:
a first correlator configured to correlate samples received from a transmitter with a first orthogonal sequence;
a second correlator configured to correlate the received samples with a second orthogonal sequence that is orthogonal to the first orthogonal sequence;
a first comparator configured to compare a resulting value of the first correlator to a second cumulative value obtained by accumulating resulting values of the second correlator;
a second comparator configured to compare a resulting value of the second correlator to a first cumulative value obtained by accumulating resulting values of the first correlator; and
an OR operator configured to perform a logical OR operation with respect to the result of the comparing by the first comparator and the result of the comparing by the second comparator,
wherein the orthogonal sequence is determined such that correlation values between the preamble sequence and the orthogonal sequence are smaller than a predetermined value, the correlation values being calculated based on phase differences between the preamble sequence and the orthogonal sequence.

13. The receiver of claim 12, further comprising:
a first accumulator configured to accumulate the resulting values of the first correlator; and
a second accumulator configured to accumulate the resulting values of the second correlator.

14. The receiver of claim 12, further comprising:
a shifter configured to shift the received samples.

15. The receiver of claim 12, wherein a correlation value between the first orthogonal sequence and the second orthogonal sequence corresponds to 0.

* * * * *